US012528443B2

(12) United States Patent
Matsumoto et al.

(10) Patent No.: US 12,528,443 B2
(45) Date of Patent: Jan. 20, 2026

(54) WORK MACHINE ACTIVATION SYSTEM AND METHOD OF ACTIVATING WORK MACHINE

(71) Applicant: KOMATSU LTD., Tokyo (JP)

(72) Inventors: Hayato Matsumoto, Tokyo (JP); Shunsuke Sugimura, Tokyo (JP); Takehiro Shibata, Tokyo (JP); Tomofumi Hokari, Tokyo (JP); Yuichiro Yasuda, Tokyo (JP); Kenji Nozaki, Tokyo (JP); Tomotaka Komatsu, Tokyo (JP); Yosuke Yamagoe, Tokyo (JP); Ryohei Kikuzawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 34 days.

(21) Appl. No.: 18/690,429

(22) PCT Filed: Sep. 28, 2022

(86) PCT No.: PCT/JP2022/036068
§ 371 (c)(1),
(2) Date: Mar. 8, 2024

(87) PCT Pub. No.: WO2023/054427
PCT Pub. Date: Apr. 6, 2023

(65) Prior Publication Data
US 2024/0375611 A1 Nov. 14, 2024

(30) Foreign Application Priority Data

Sep. 30, 2021 (JP) ................................. 2021-161099

(51) Int. Cl.
*B60R 25/24* (2013.01)
(52) U.S. Cl.
CPC ......... *B60R 25/24* (2013.01); *B60Y 2200/412* (2013.01)
(58) Field of Classification Search
CPC .......................... B60R 25/24; B60Y 2200/412
See application file for complete search history.

(56) References Cited

U.S. PATENT DOCUMENTS 8,957,760 B2 * 2/2015 Nishijima ............... B60L 53/14
307/10.4
11,247,741 B2 * 2/2022 Aoki ....................... B60R 25/24
(Continued)

FOREIGN PATENT DOCUMENTS

JP  2002-70084 A  3/2002
JP  2015-164847 A  9/2015
(Continued)

*Primary Examiner* — Thomas D Alunkal
(74) *Attorney, Agent, or Firm* — GLOBAL IP COUNSELORS, LLP

(57) ABSTRACT

A work machine activation system includes a management device and an authentication device. The management device stores authentication information usable to authenticate a plurality of operators who are able to operate a work machine. The authentication device authenticates an operator operating the work machine. The authentication device includes a storage unit that stores the authentication information of an operator authenticated in the past, and an authentication unit that authenticates the operator based on the authentication information stored in the storage unit when the management device has not been activated.

16 Claims, 11 Drawing Sheets

(56) References Cited

U.S. PATENT DOCUMENTS

| | | | |
|---|---|---|---|
| 2008/0150677 A1* | 6/2008 | Arakawa | E02F 9/24 |
| | | | 340/5.2 |
| 2008/0154712 A1* | 6/2008 | Wellman | B60K 35/81 |
| | | | 235/375 |
| 2015/0052591 A1* | 2/2015 | Miura | A01B 79/005 |
| | | | 726/4 |
| 2017/0261978 A1* | 9/2017 | Gresch | G07F 17/0057 |
| 2018/0051442 A1 | 2/2018 | Igarashi et al. | |
| 2022/0097650 A1* | 3/2022 | Hanzaki | H04W 12/06 |
| 2023/0069607 A1* | 3/2023 | Nagel | G05D 1/0022 |

FOREIGN PATENT DOCUMENTS

| | | |
|---|---|---|
| JP | 2017-8524 A | 1/2017 |
| JP | 2020-158997 A | 10/2020 |
| JP | 2021-110136 A | 8/2021 |

\* cited by examiner

WORK MACHINE ACTIVATION SYSTEM AND METHOD OF ACTIVATING WORK MACHINE

CROSS-REFERENCE TO RELATED APPLICATIONS

This application is a U.S. National stage application of International Application No. PCT/JP2022/036068, filed on Sep. 28, 2022. This U.S. National stage application claims priority under 35 U.S.C. § 119 (a) to Japanese Patent Application No. 2021-161099, filed in Japan on Sep. 30, 2021, the entire contents of which are hereby incorporated herein by reference.

BACKGROUND

Technical Field

The present disclosure relates to a work machine activation system and a method of activating a work machine.

Background Information

The number of operators who operate one work machine is not limited to one, and the work machine may be operated by a plurality of operators. On the other hand, it is necessary to prevent a work machine from being operated by an unauthorized user. Therefore, a work machine having a function of authenticating an operator operating the work machine is known (for example, see Japanese Unexamined Patent Application, First Publication No. 2015-164847).

SUMMARY

A work machine includes a plurality of components including a management device that stores authentication information of a plurality of operators. When the work machine activates, the plurality of components included in the work machine also activate, but a time required for each of the components to activate is not the same. Therefore, there are cases in which authentication is not possible because the management device that stores authentication information is not activated even though an authentication device used to authenticate an operator has been activated.

An objective of the present disclosure is to provide a work machine activation system and a method of activating a work machine that enable authentication of an operator even if a management device that stores authentication information is not activated.

According to one aspect of the present invention, a work machine activation system includes a management device storing authentication information for authenticating a plurality of operators who are able to operate a work machine, and an authentication device authenticating an operator operating the work machine, in which the authentication device includes a storage unit storing the authentication information of an operator authenticated in the past, and an authentication unit authenticating the operator on the basis of the authentication information stored in the storage unit when the management device has not been activated.

According to the above-described aspect, it is possible for the work machine activation system to perform authentication of an operator even if the management device that stores authentication information is not activated.

DETAILED DESCRIPTION OF EMBODIMENT(S)

First Embodiment

Figure 1:
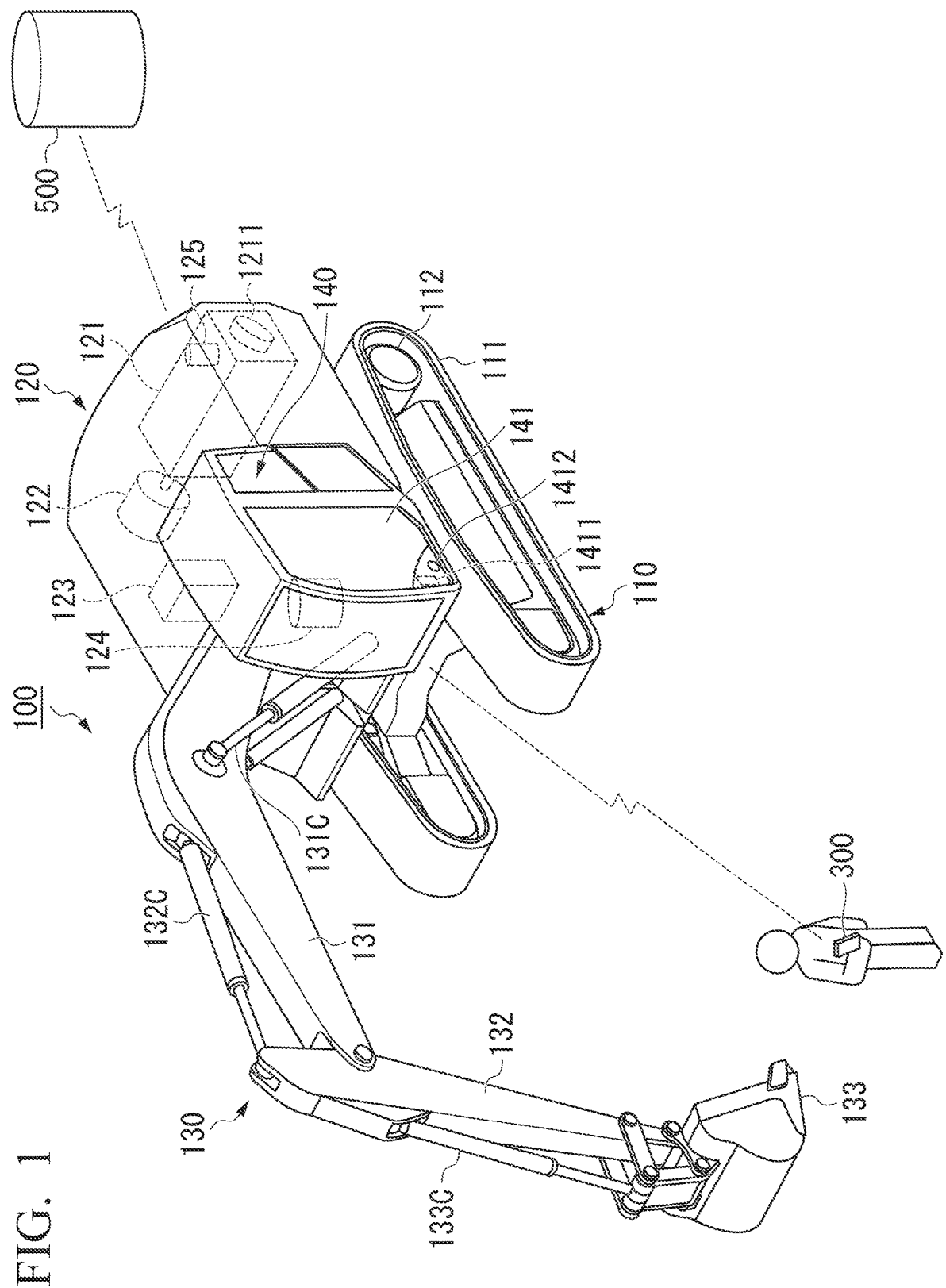
FIG. 1 is a schematic view illustrating a configuration of a work machine according to a first embodiment.

Hereinafter, an embodiment will be described in detail with reference to the drawings.
(Configuration of Work Machine 100)
FIG. 1 is a schematic view illustrating a configuration of a work machine 100 according to a first embodiment.

The work machine 100 operates at a construction site and performs a construction on a construction object such as earth. The work machine 100 according to the first embodiment is, for example, a hydraulic excavator. The work machine 100 includes an undercarriage 110, a swing body 120, work equipment 130, and a cab 140. The work machine 100 according to the first embodiment performs authentication of an operator by communicating with an operator terminal 300 such as a smartphone owned by the operator using Bluetooth low energy (BLE, Bluetooth is a registered trademark). Note that, in other embodiments, the work machine 100 and the operator terminal 300 may communicate using a near field communication method other than BLE such as Bluetooth (registered trademark) or Zigbee (registered trademark). Also, the work machine 100 receives master data used for authentication of an operator from a remote server device 500 via wide area communication such as the Internet. Thereby, it is possible for the work machine 100 to perform authentication processing using latest master data even if an available operator has changed.

The master data stored by the server device 500 is data in which an operator ID, a password, a display name, information indicating authority to operate the work machine 100, operation setting data, and a Bluetooth (registered trademark) device address are associated for each operator. The operation setting data is data used when a hydraulic circuit is controlled. Due to the information indicating operation authority, it is possible to identify whether or not the operator has authority to operate the work machine 100, contents that may be set on a monitor, and the like. Also, the operation setting data is data representing a relationship between an operation amount and a control amount. The operation setting data may be, for example, a weighted value for the control amount or a function indicating a relationship between the operation amount and the control amount.

The undercarriage 110 supports the work machine 100 to be able to travel. The undercarriage 110 includes two endless tracks 111 provided on the left and right and two travel motors 112 for driving the endless tracks 111.

The swing body 120 is supported by the undercarriage 110 to be able to swing around a swing center.

The work equipment 130 is driven by a hydraulic pressure. The work equipment 130 is supported by a front portion of the swing body 120 so that it is able to be driven in a vertical direction. The cab 140 is a space for an operator to be on board and perform an operation of the work machine 100. The cab 140 is provided in a left front portion of the swing body 120.

Here, a portion of the swing body 120 to which the work equipment 130 is attached is referred to as a front portion. Also, for the swing body 120, with the front portion as a reference, a portion on an opposite side is referred to as a rear portion, a portion on a left side is referred to as a left portion, and a portion on a right side is referred to as a right portion.

(Configuration of Swing Body 120)

The swing body 120 includes an engine 121, a hydraulic pump 122, a control valve 123, a swing motor 124, and a fuel injection device 125.

The engine 121 is a prime mover that drives the hydraulic pump 122. A starter motor 1211 is provided in the engine 121. The engine 121 is activated by rotation of the starter motor 1211.

The hydraulic pump 122 is a variable capacity pump driven by the engine 121. The hydraulic pump 122 supplies a hydraulic oil to each of actuators (a boom cylinder 131C, an arm cylinder 132C, a bucket cylinder 133C, the travel motors 112, and the swing motor 124) via the control valve 123.

The control valve 123 controls a flow rate of the hydraulic oil supplied from the hydraulic pump 122.

The swing motor 124 is driven by the hydraulic oil supplied from the hydraulic pump 122 via the control valve 123 to swing the swing body 120.

The fuel injection device 125 injects fuel into the engine 121.

(Configuration of Work Equipment 130)

The work equipment 130 includes a boom 131, an arm 132, a bucket 133, the boom cylinder 131C, the arm cylinder 132C, and the bucket cylinder 133C.

A base end portion of the boom 131 is attached to the swing body 120 via a boom pin.

The arm 132 connects the boom 131 and the bucket 133. A base end portion of the arm 132 is attached to a distal end portion of the boom 131 via an arm pin.

The bucket 133 includes bucket teeth for excavating earth or the like, and an accommodation portion for accommodating the excavated earth. A base end portion of the bucket 133 is attached to a distal end portion of the arm 132 via a bucket pin.

The boom cylinder 131C is a hydraulic cylinder for operating the boom 131. A base end portion of the boom cylinder 131C is attached to the swing body 120. A distal end portion of the boom cylinder 131C is attached to the boom 131.

The arm cylinder 132C is a hydraulic cylinder for driving the arm 132. A base end portion of the arm cylinder 132C is attached to the boom 131. A distal end portion of the arm cylinder 132C is attached to the arm 132.

The bucket cylinder 133C is a hydraulic cylinder for driving the bucket 133. A base end portion of the bucket cylinder 133C is attached to the arm 132. A distal end portion of the bucket cylinder 133C is attached to a link member connected to the bucket 133.

(Configuration of Cab 140)

A door 141 for an operator to be on board is provided on a left surface of the cab 140. A lock actuator 1411 for locking the door 141 and a door switch 1412 for unlocking the door 141 are provided in the door 141.

Figure 2:
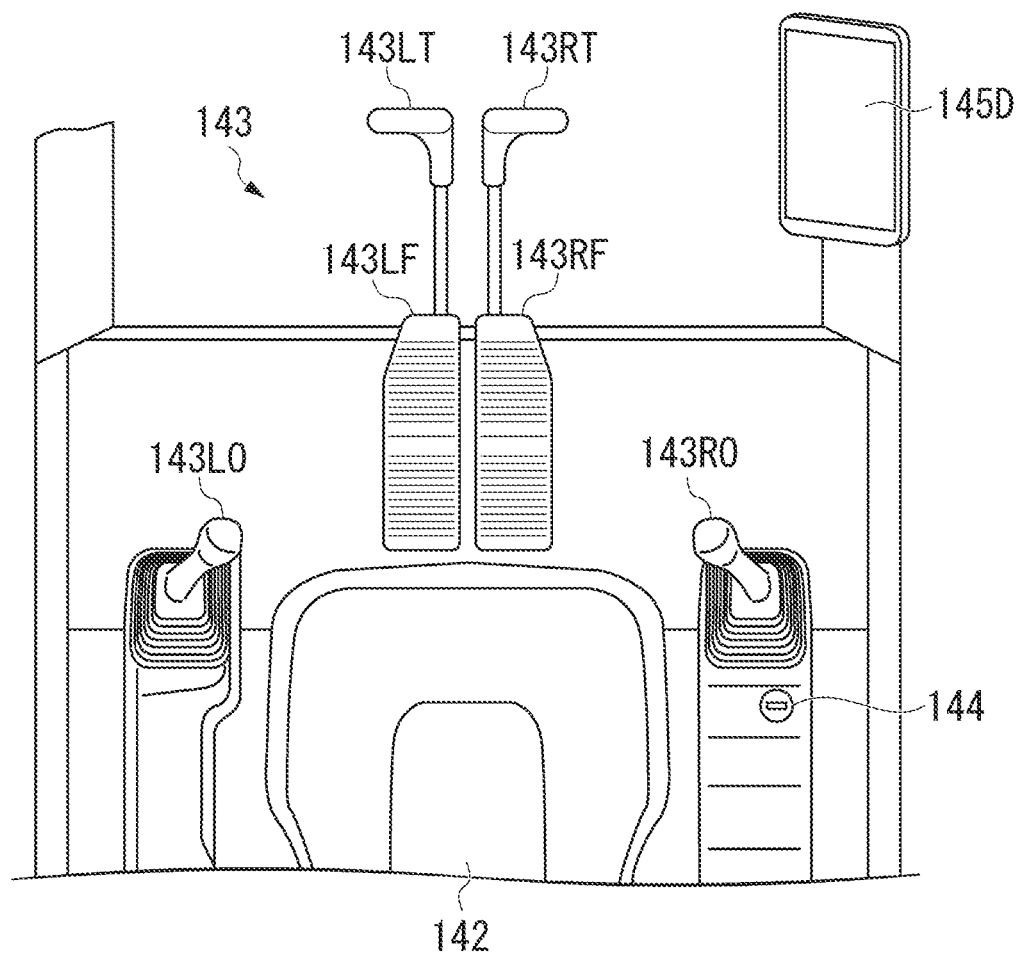
FIG. 2 is a view illustrating a configuration inside a cab according to the first embodiment.

FIG. 2 is a view illustrating a configuration inside the cab 140 according to the first embodiment.

A driver's seat 142, an operation device 143, a rotary switch 144, and a touch panel 145D are provided in the cab 140. The rotary switch 144 is a switch that takes four positions of OFF, ACC (accessories), IG (ignition), and ST (start) due to rotation thereof. Note that, when the operator releases his/her finger from the rotary switch 144 at the ST position, the rotary switch 144 automatically returns to the IG position due to a spring mechanism (not illustrated).

The operation device 143 is a device for driving the undercarriage 110, the swing body 120, and the work equipment 130 due to a manual operation by the operator. The operation device 143 includes a left operation lever 143LO, a right operation lever 143RO, a left foot pedal 143LF, a right foot pedal 143RF, a left travel lever 143LT, and a right travel lever 143RT.

The left operation lever 143LO is provided on a left side of the driver's seat 142. The right operation lever 143RO is provided on a right side of the driver's seat 142.

The left operation lever 143LO is an operation mechanism for performing a swing operation of the swing body 120 and an excavating/dumping operation of the arm 132. Specifically, when the operator of the work machine 100 tilts the left operation lever 143LO forward, the arm 132 performs a dumping operation. Also, when the operator of the work machine 100 tilts the left operation lever 143LO rearward, the arm 132 performs an excavating operation. Also, when the operator of the work machine 100 tilts the left operation lever 143LO in a right direction, the swing body 120 swings rightward. Also, when the operator of the work machine 100 tilts the left operation lever 143LO in a left direction, the swing body 120 swings leftward. Note that, in another embodiment, the swing body 120 may swing rightward or leftward when the left operation lever 143LO is tilted in a front-rear direction, and the arm 132 may perform an excavating operation or a dumping operation when the left operation lever 143LO is tilted in a left-right direction.

The right operation lever 143RO is an operation mechanism for performing an excavating/dumping operation of the bucket 133 and raising/lowering operations of the boom 131. Specifically, when the operator of the work machine 100 tilts the right operation lever 143RO forward, a lowering operation of the boom 131 is executed. Also, when the operator of the work machine 100 tilts the right operation lever 143RO rearward, a raising operation of the boom 131 is executed. Also, when the operator of the work machine 100 tilts the right operation lever 143RO in a right direction, a dumping operation of the bucket 133 is performed. Also, when the operator of the work machine 100 tilts the right operation lever 143RO in a left direction, an excavating operation of the bucket 133 is performed. Note that, in another embodiment, when the right operation lever 143RO is tilted in a front-rear direction, the bucket 133 may perform a dumping operation or an excavating operation, and when the right operation lever 143RO is tilted in a left-right direction, the boom 131 may perform a raising operation or a lowering operation.

The left foot pedal 143LF is disposed on a left side of a floor in front of the driver's seat 142. The right foot pedal 143RF is disposed on a right side of the floor in front of the driver's seat 142. The left travel lever 143LT is pivotally supported by the left foot pedal 143LF, and is configured so that an inclination of the left travel lever 143LT and a depression of the left foot pedal 143LF are interlocked. The right travel lever 143RT is pivotally supported by the right foot pedal 143RF, and is configured so that an inclination of the right travel lever 143RT and a depression of the right foot pedal 143RF are interlocked.

The left foot pedal 143LF and the left travel lever 143LT correspond to a rotational drive of a left crawler track of the undercarriage 110. Specifically, when the operator of the work machine 100 tilts the left foot pedal 143LF or the left travel lever 143LT forward, the left crawler track rotates in a forward direction. Also, when the operator of the work machine 100 tilts the left foot pedal 143LF or the left travel lever 143LT rearward, the left crawler track rotates in a rearward direction.

The right foot pedal 143RF and the right travel lever 143RT correspond to a rotational drive of a right crawler track of the undercarriage 110. Specifically, when the operator of the work machine 100 tilts the right foot pedal 143RF or the right travel lever 143RT forward, the right crawler track rotates in a forward direction. Also, when the operator of the work machine 100 tilts the right foot pedal 143RF or the right travel lever 143RT rearward, the right crawler track rotates in a rearward direction.

(Configuration of Control System 145)

Figure 3:
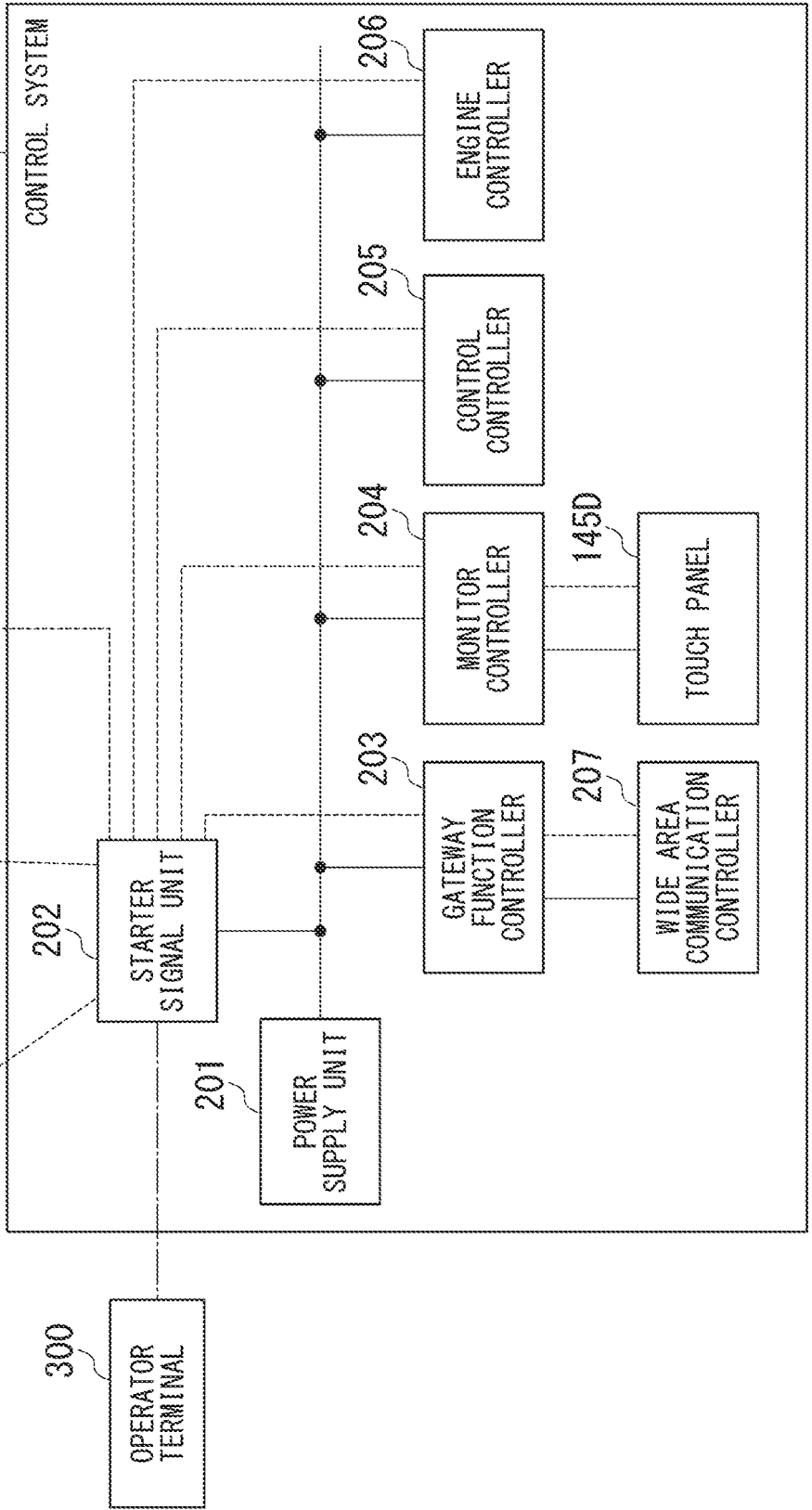
FIG. 3 is a schematic block diagram showing a hardware configuration of a control system according to the first embodiment.

FIG. 3 is a schematic block diagram showing a hardware configuration of a control system 145 according to the first embodiment. In FIG. 3, the solid line represents a power line, and the broken line represents a signal line. Also, in FIG. 3, the dashed-dotted line represents wireless communication.

The control system 145 includes a power supply unit 201, a starter signal unit 202, a gateway function controller 203, a monitor controller 204, a control controller 205, an engine controller 206, and a wide area communication controller 207. The starter signal unit 202, the gateway function controller 203, the monitor controller 204, the control controller 205, and the engine controller 206 are connected to each other via an internal network of the work machine 100 such as a controller area network (CAN) or Ethernet (registered trademark).

The power supply unit 201 supplies electric energy to each device configuring the control system 145.

The starter signal unit 202 receives a signal input from the door switch 1412, the rotary switch 144, the operator terminal 300, and the monitor controller 204. The starter signal unit 202 outputs an activation signal or a drive signal to the gateway function controller 203, the monitor controller 204, the control controller 205, the engine controller 206, the wide area communication controller 207, the lock actuator 1411, or the starter motor 1211 on the basis of the input signal. The controllers to which the activation signal has been input are activated and operated by the electric energy supplied from the power supply unit 201. Note that, the starter signal unit 202 always operates by receiving electric energy from the power supply unit 201 even when other controllers are in a stopped state. On the other hand, when the work machine 100 is not activated, the starter signal unit 202 may be configured such that only a BLE communication unit 221 to be described later is in an activated state and the other components are in a dormant state, or is activated intermittently.

The gateway function controller 203 relays communication between controllers such as the starter signal unit 202, the monitor controller 204, the control controller 205, and the engine controller 206. Particularly, the gateway function controller 203 stores authentication master data of the operator that the wide area communication controller 207 has received from the server device via the wide area communication network, and transmits it to other components connected via the internal network. That is, the gateway function controller 203 is an example of a management device that stores authentication information for authenticating a plurality of operators who are able to operate the work machine 100.

The monitor controller 204 controls a display on the touch panel 145D included in the control system 145, and notifies occurrence of a touch operation on the touch panel 145D. Note that, the control system 145 according to another embodiment may include a monitor that does not have a touch input function such as a liquid crystal display (LCD) and a physical button instead of the touch panel 145D. In this case, the monitor controller 204 controls a display on the monitor and notifies a press of the physical button.

The control controller 205 acquires data of various types related to hydraulic equipment that controls an operation of the work equipment 130 by using a sensor (not illustrated), and outputs a control signal for controlling the hydraulic equipment according to an operation of the operation device 143. That is, the control controller 205 controls driving of the boom cylinder 131C, the arm cylinder 132C, the bucket cylinder 133C, the travel motor 112, the swing motor 124, and the like. In other words, the control controller 205 is an example of a vehicle body control device.

The engine controller 206 acquires data of various types related to the engine 121 by using a sensor (not illustrated) and controls the engine 121 by instructing an amount of fuel to be injected to the fuel injection device 125.

The wide area communication controller 207 has a function of communication via a wide area communication network. The wide area communication controller 207 receives master data used for authentication of the operator received from the server device through communication via the wide area communication network. The wide area communication controller 207 is activated intermittently at a predetermined cycle (for example, at a cycle of 24 hours) to receive data from the server device 500.

The control system 145 has a function of performing login processing of the operator who is on board the cab 140 due to an operation on the touch panel 145D. For example, the control system 145 may include a controller that performs login processing, or the starter signal unit 202, the gateway function controller 203, and the monitor controller 204 may have a function that performs login processing. Specifically, the control system 145 displays a selection screen of the operator ID on the touch panel 145D via the monitor controller 204, and accepts selection of the operator ID. When the selected operator ID indicates an operator who is in proximity to the work machine 100 and has operation authority, the control system 145 authenticates that the operator on board the cab 140 is an operator who has the operation authority. The monitor controller 204 is an example of an authentication device that authenticates the operator of the work machine 100.

Figure 4:
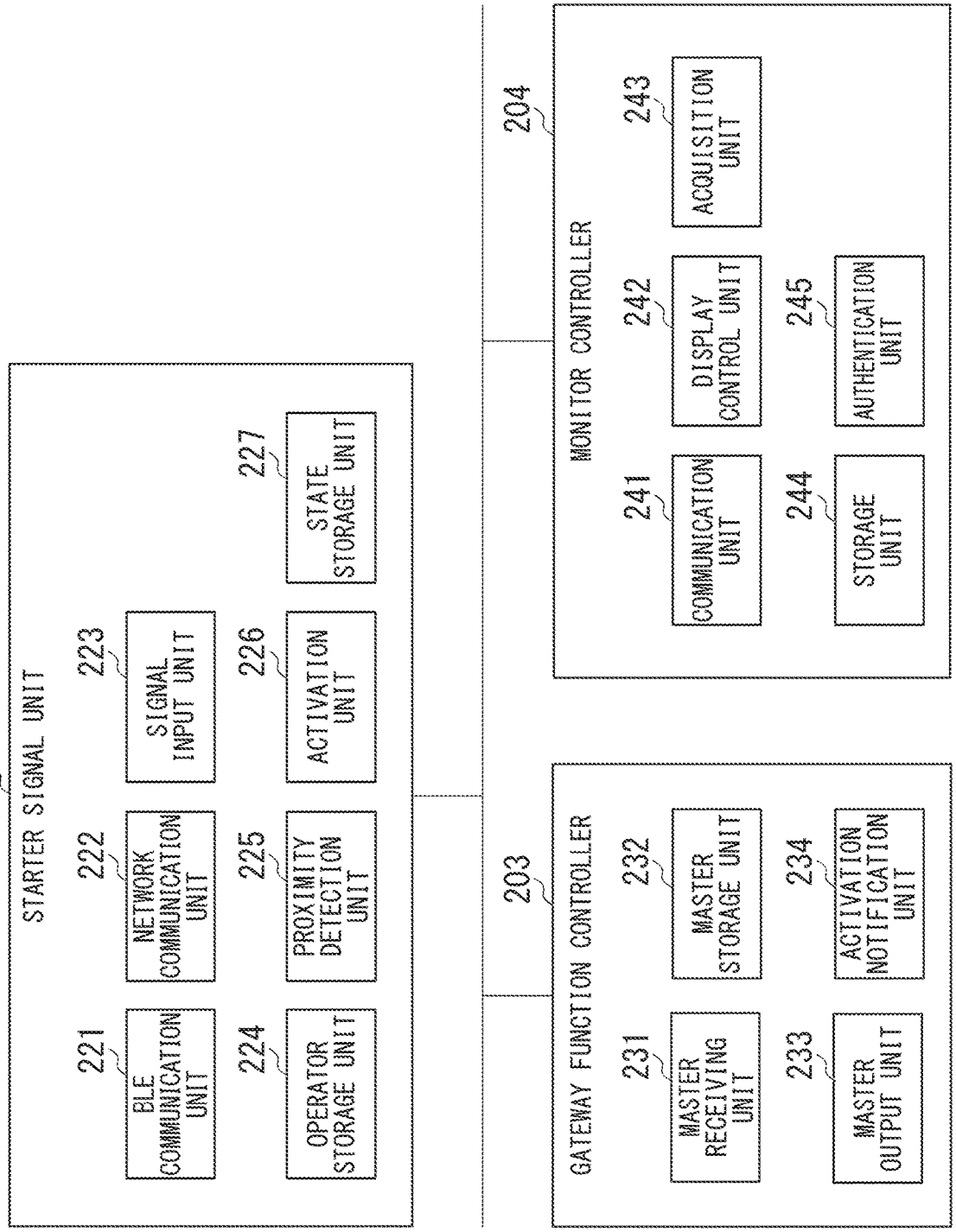
FIG. 4 is a schematic block diagram showing a software configuration of a starter signal unit, a gateway function controller, and a monitor controller according to the first embodiment.

FIG. 4 is a schematic block diagram showing a software configuration of the starter signal unit 202, the gateway function controller 203, and the monitor controller 204 according to the first embodiment.

The starter signal unit 202 includes the BLE communication unit 221, a network communication unit 222, a signal input unit 223, an operator storage unit 224, an proximity detection unit 225, an activation unit 226, and a state storage unit 227.

The BLE communication unit 221 operates as a BLE central and communicates with the operator terminal 300. The BLE communication unit 221 searches for the operator terminal 300 capable of communication and receives an advertisement packet from the found operator terminal 300. The advertisement packet includes a device address that identifies the operator terminal 300 and a machine ID that indicates the work machine 100 to be activated. The advertisement packet is encrypted by key data exchanged with the starter signal unit 202 during pairing. The BLE communication unit 221 decrypts the advertisement packet by using the key data stored in the operator storage unit 224.

The network communication unit 222 communicates with other controllers through an in-vehicle network.

The signal input unit 223 receives a signal input from the door switch 1412 and the rotary switch 144.

The operator storage unit 224 is data in which a device address of the operator terminal 300 operated by the operator is associated with key data for each operator having authority to operate the work machine 100. Hereinafter, an operator who has authority to operate the work machine 100 will also be referred to as a specific operator.

The proximity detection unit 225 determines whether or not the specific operator is present in the vicinity of the work machine 100 on the basis of whether or not the BLE communication unit 221 has been paired with the operator terminal 300 that is a source of the advertisement packet. That is, the proximity detection unit 225 detects that the specific operator is in proximity to the work machine 100. Specifically, when the BLE communication unit 221 decrypts the advertisement packet and establishes a connection with the operator terminal 300, the proximity detection unit 225 determines that the specific operator is in proximity to the work machine 100. The proximity detection unit 225 records the device address of the operator terminal 300 in the state storage unit 227 as a proximity state of the specific operator.

The activation unit 226 outputs an activation signal or a drive signal to the gateway function controller 203, the monitor controller 204, the control controller 205, the engine controller 206, the lock actuator 1411, or the starter motor 1211. The state storage unit 227 stores the device address of the operator terminal 300.

The gateway function controller 203 includes a master receiving unit 231, a master storage unit 232, a master output unit 233, and an activation notification unit 234.

The master receiving unit 231 updates master data stored in the master storage unit 232 by receiving the latest master data via the wide area communication controller 207.

The master storage unit 232 stores the master data. The master data is data, in which an operator ID, a password, a display name, information indicating operation authority that indicates whether or not the operator has authority to operate the work machine 100, operation setting data, and a device address are associated, for each operator.

The master output unit 233 transmits authentication master data including the operator ID, the password, the display name, and the information indicating the operation authority that indicates whether or not the operator has authority to operate the work machine 100 among the master data stored in the master storage unit 232 to the starter signal unit 202 and the monitor controller 204. Also, the master output unit 233 transmits operation setting data associated with the operator ID of the logged-in operator in the master storage unit 232 to the control controller 205. Thereby, it is possible to reflect the operation setting data of the operator on board on the control controller 205.

When the gateway function controller 203 is activated by the activation signal received from the starter signal unit 202, the activation notification unit 234 outputs an activation notification indicating completion of the activation via the internal network.

The monitor controller 204 includes a communication unit 241, a display control unit 242, an acquisition unit 243, a storage unit 244, and an authentication unit 245.

The communication unit 241 performs communication via the internal network.

The display control unit 242 causes the touch panel 145D to display a screen for authentication of the operator. For example, the display control unit 242 causes it to display a selection screen for a list of operators.

The acquisition unit 243 acquires input information for authentication from the operator via the touch panel 145D.

The storage unit 244 stores the input information acquired from the operator when the authentication processing by the authentication unit 245 has been successful. The storage unit 244 may hash the input information and store the hashed information. The storage unit 244 is a storage region provided in a nonvolatile memory.

The authentication unit 245 authenticates the operator on the basis of the input information acquired by the acquisition unit 243. The authentication unit 245 authenticates the operator by collating the input information with the gateway function controller 203. However, if the activation of the gateway function controller 203 has not been completed, the authentication unit 245 authenticates the operator by collating the past input information stored in the storage unit 244 with the input information acquired by the acquisition unit 243.

(Operator Terminal 300)

The operator terminal 300 functions as a BLE peripheral by executing an activation program of the work machine 100 installed in advance. When the operator terminal 300 executes the activation program, it displays a list of the work machines 100 and accepts selection of the work machine 100 to be activated from the operator. When the selection of the work machine 100 is accepted, the operator terminal 300 starts transmission of the advertisement packet including the device address and the machine ID of the selected work machine 100.

(Operation of Control System 145)

Figure 5:
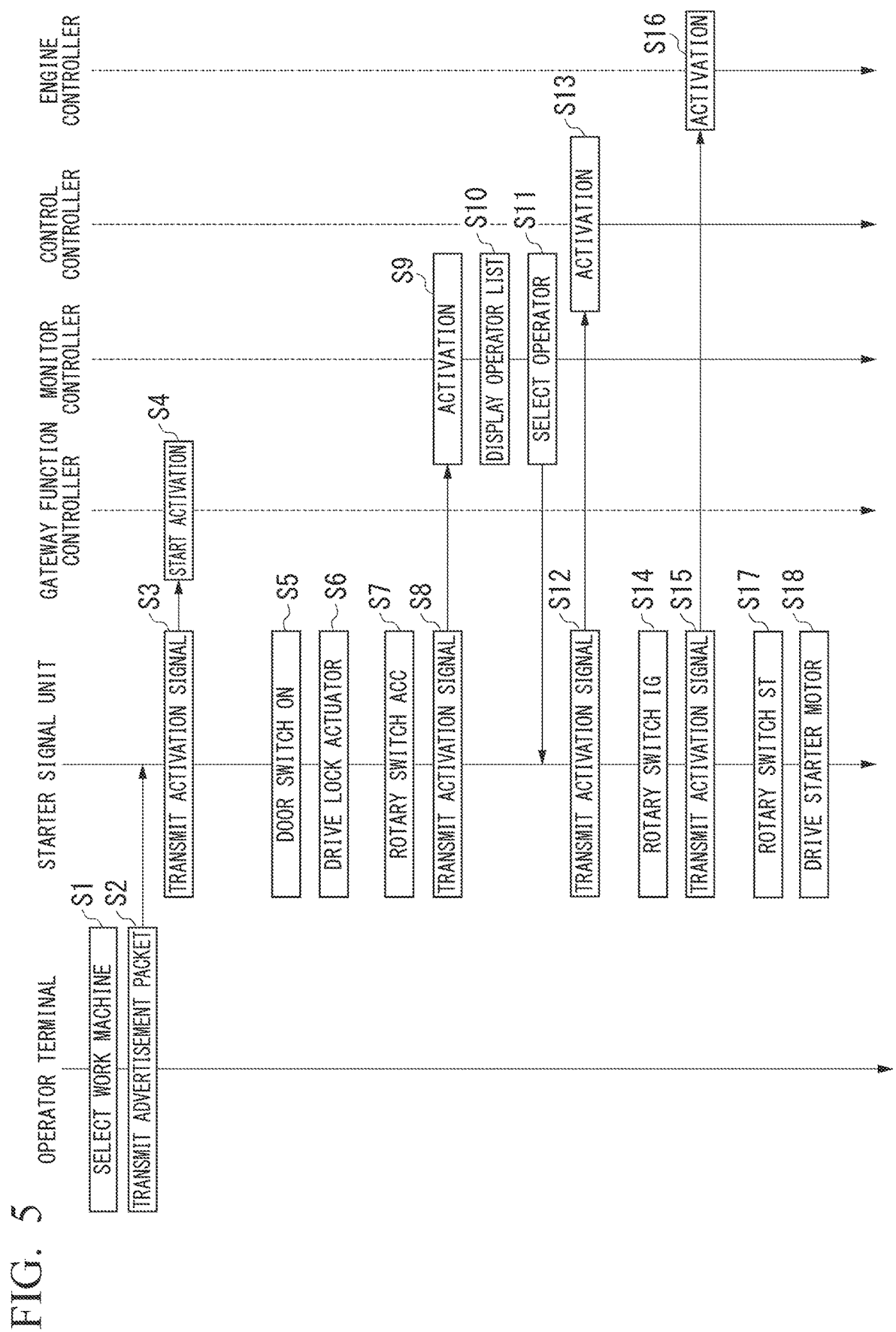
FIG. 5 is a sequence diagram showing an example of an activation operation of the work machine due to the control system in the first embodiment.

Here, an activation operation of the work machine 100 when an operator (specific operator) who has authority to operate the work machine 100 boards the work machine 100 will be described. The control system 145 is an example of an activation system of the work machine 100. FIG. 5 is a sequence diagram showing an example of the activation operation of the work machine 100 due to the control system 145 in the first embodiment.

When the operator operates the operator terminal 300 to execute the activation program, the operator terminal 300 displays a list of the work machines 100 and accepts selection of the work machine 100 to be activated from the operator (step S1). When the selection of the work machine 100 is accepted, the operator terminal 300 transmits an advertisement packet including the device address and the machine ID of the selected work machine 100 (step S2).

When the starter signal unit 202 receives the advertisement packet and determines that the specific operator is in proximity, it transmits an activation signal to the gateway function controller 203 (step S3). Thereby, the gateway function controller 203 starts the activation (step S4). However, after the gateway function controller 203 is powered on, it activates through processing such as executing a boot program and reading and activating an OS, it may require time until the activation is completed.

When the operator reaches the work machine 100, the operator presses the door switch 1412 to open the door 141. Thereby, the starter signal unit 202 receives a signal indicating ON from the door switch 1412 (step S5). After the starter signal unit 202 confirms a proximity state of the specific operator, the starter signal unit 202 drives the lock actuator 1411 to unlock the door 141 (step S6).

When the operator boards the cab 140 and turns the rotary switch 144 to the ACC position, the starter signal unit 202 receives a signal indicating the ACC from the rotary switch 144 (step S7). After the starter signal unit 202 confirms the proximity state of the specific operator, it drives the lock actuator 1411 to unlock the door 141. After the starter signal unit 202 confirms the proximity state of the specific operator, it transmits an activation signal to the monitor controller 204 (step S8). Thereby, the monitor controller 204 is activated (step S9).

The monitor controller 204 outputs a signal for displaying a list screen of operators to the touch panel 145D (step S10). Thereby, the monitor controller 204 displays the list screen of operators on the touch panel 145D. However, at this time, if the activation of the gateway function controller 203 has not been completed, the monitor controller 204 executes a simple authentication processing. Note that, when the rotary switch 144 is at the ACC position, the engine 121 is not activated. That is, the starter signal unit 202 displays the list screen of operators while the engine 121 is stopped. The monitor controller 204 accepts selection of one operator ID from the list screen of operators due to an operation of the operator (step S11).

The starter signal unit 202 confirms that the selected operator ID indicates the specific operator, and transmits an activation signal to the control controller 205 (step S12). Thereby, the control controller 205 is activated (step S13). Note that, in another embodiment, the starter signal unit 202 may activate the control controller 205 at the same timing as the monitor controller 204 in step S9.

When the operator turns the rotary switch 144 to the IG position, the starter signal unit 202 receives a signal indicating IG from the rotary switch 144 (step S14). The starter signal unit 202 transmits an activation signal to the engine controller 206 (step S15). Thereby, the engine controller 206 is activated (step S16).

When the operator turns the rotary switch 144 to the ST position, the starter signal unit 202 receives a signal indicating ST from the rotary switch 144 (step S17). The starter signal unit 202 drives the starter motor 1211 (step S18). Thereby, the engine 121 is started, and the work machine 100 becomes an operable state.

As described above, since the gateway function controller 203 takes time to be activated compared to other devices, it is possible to accelerate the timing of activation completion of the gateway function controller 203 by being activated on the condition that the specific operator is in proximity.

«Authentication Processing»

Here, authentication processing for an operator on board the work machine 100 by the control system 145 according to the first embodiment will be described.

When an operator on board the work machine 100 turns the rotary switch 144 to the ACC position, the signal input unit 223 of the starter signal unit 202 receives an input of a signal indicating ACC from the rotary switch 144. When the signal indicating ACC is input, the activation unit 226 transmits an activation signal to the monitor controller 204.

When the monitor controller 204 is activated, the communication unit 241 transmits an arrival confirmation signal that confirms whether or not activation of the gateway function controller 203 has been completed via the internal network. If the gateway function controller 203 has been activated, the activation notification unit 234 of the gateway function controller 203 returns ACK of the arrival confirmation signal. On the other hand, if the gateway function controller 203 has not been activated, the communication unit 241 is not able to receive ACK of the arrival confirmation signal.

Figure 6:
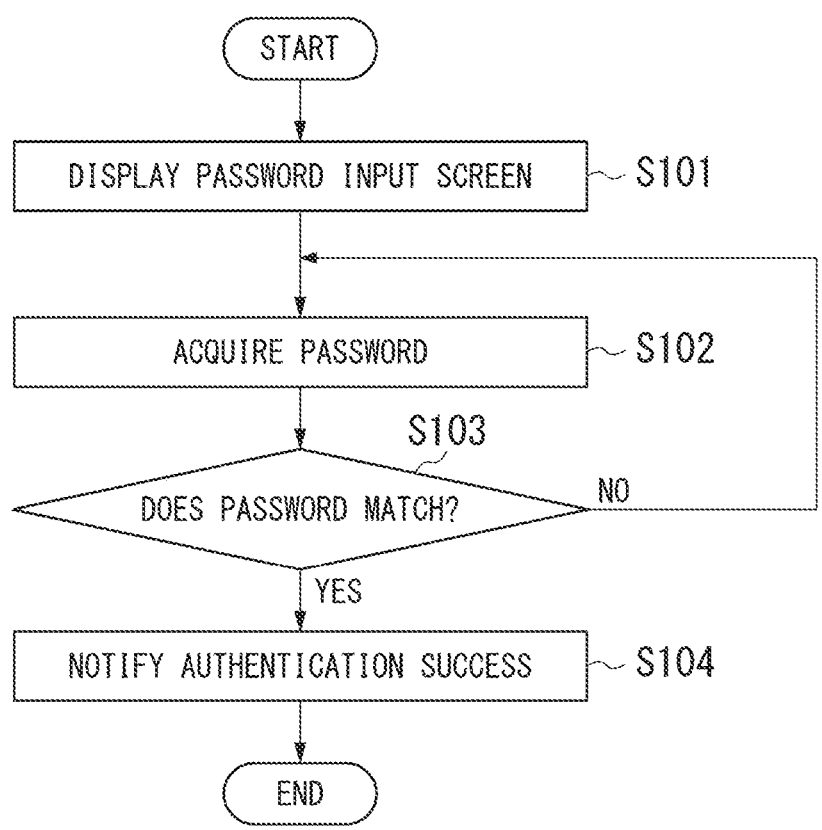
FIG. 6 is a flowchart showing simple authentication processing for an operator before the gateway function controller according to the first embodiment is activated.
Figure 7:
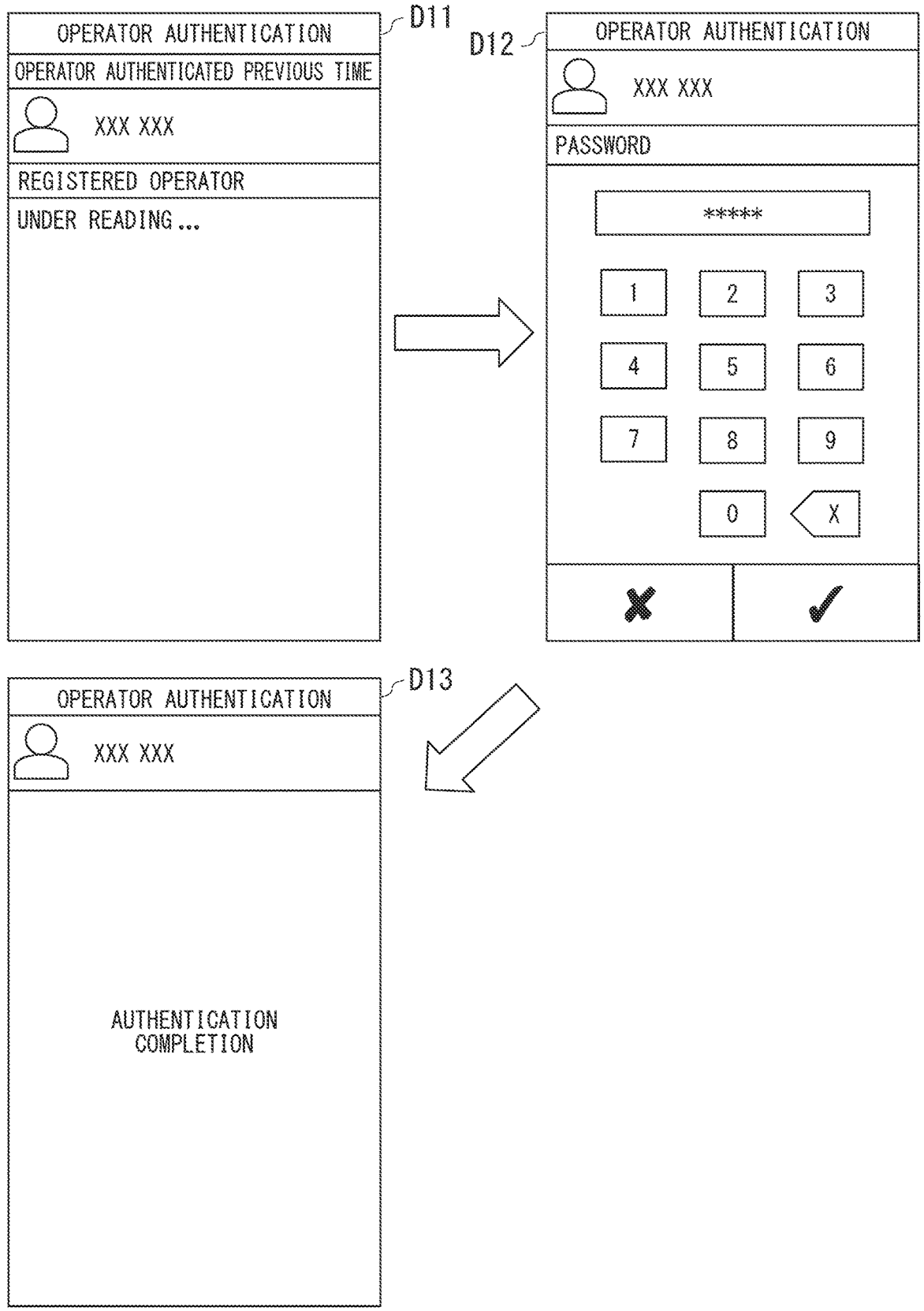
FIG. 7 is an example of a display screen of a touch panel in the simple authentication processing according to the first embodiment.

FIG. 6 is a flowchart showing simple authentication processing for an operator before the gateway function controller 203 according to the first embodiment is activated. FIG. 7 is an example of a display screen of the touch panel 145D in the simple authentication processing according to the first embodiment.

If the activation of the gateway function controller 203 is not completed, the authentication unit 245 displays an operator selection screen D11 as shown in FIG. 7. On the operator selection screen D11, a display name of the last authenticated operator stored in the storage unit 244 is displayed to be selectable, and an indication that other operators are being read is displayed. When the last authenticated operator is touched here, a password input screen D12 of the operator is displayed (step S101). The acquisition unit 243 acquires a password from the operator via the touch panel 145D (step S102).

The authentication unit 245 performs authentication processing of the operator by collating the password acquired in step S102 with the password stored in the storage unit 244 (step S103). If the password acquired in step S102 matches the password stored in the storage unit 244 (step S103: YES), the authentication unit 245 determines that the simple authentication of the operator has been successful. The display control unit 242 causes a login completion screen D13 to be displayed on the touch panel 145D. The communication unit 241 outputs a notification of completion of the simple authentication of the operator to the control controller 205 (step $104). When the control controller 205 receives the notification of completion of the simple authentication, it uses the operation setting data recorded in a non-volatile memory (not shown) during the previous operation without initializing it.

Thereby, it is possible for the control controller 205 to perform a control based on the operation setting data at the time of the previous authentication. By the operation setting data at the time of the previous authentication being recorded in the non-volatile memory (not shown), it is possible for the control controller 205 to reflect the operation setting data even when the gateway function controller 203 has not been activated.

On the other hand, if the password acquired in step S102 does not match the password stored in the storage unit 244 (step S103: NO), the monitor controller 204 returns the processing to step S102 and continues the authentication processing based on the password.

However, although the input information stored in the storage unit 244 has been successfully authenticated at the time of the previous activation, it may not be the latest information for authentication. For example, the master data stored in the server device 500 may have been updated between the previous activation and the current activation.

Figure 8:
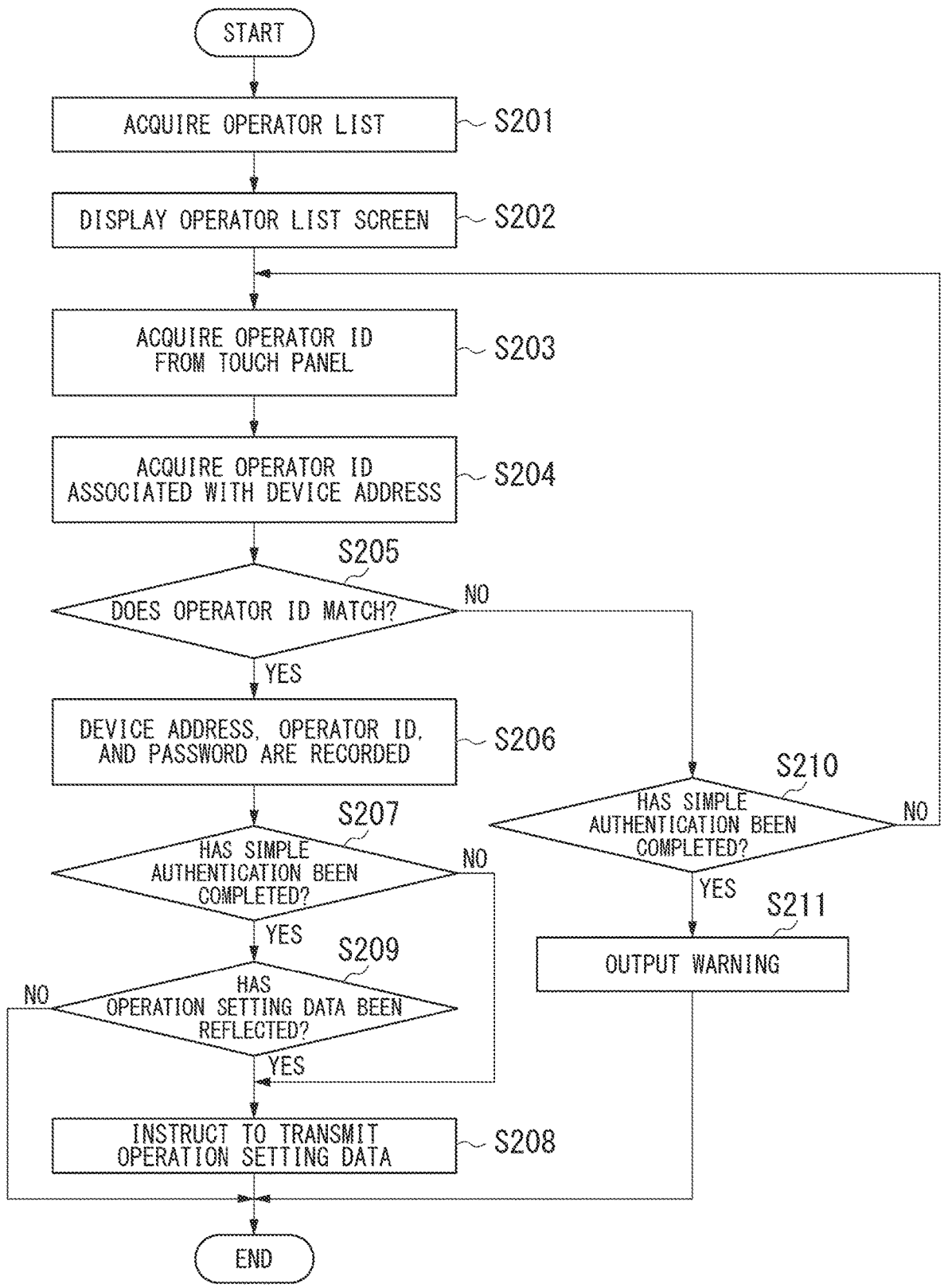
FIG. 8 is a flowchart showing authentication processing for an operator after the gateway function controller according to the first embodiment is activated.
Figure 9:
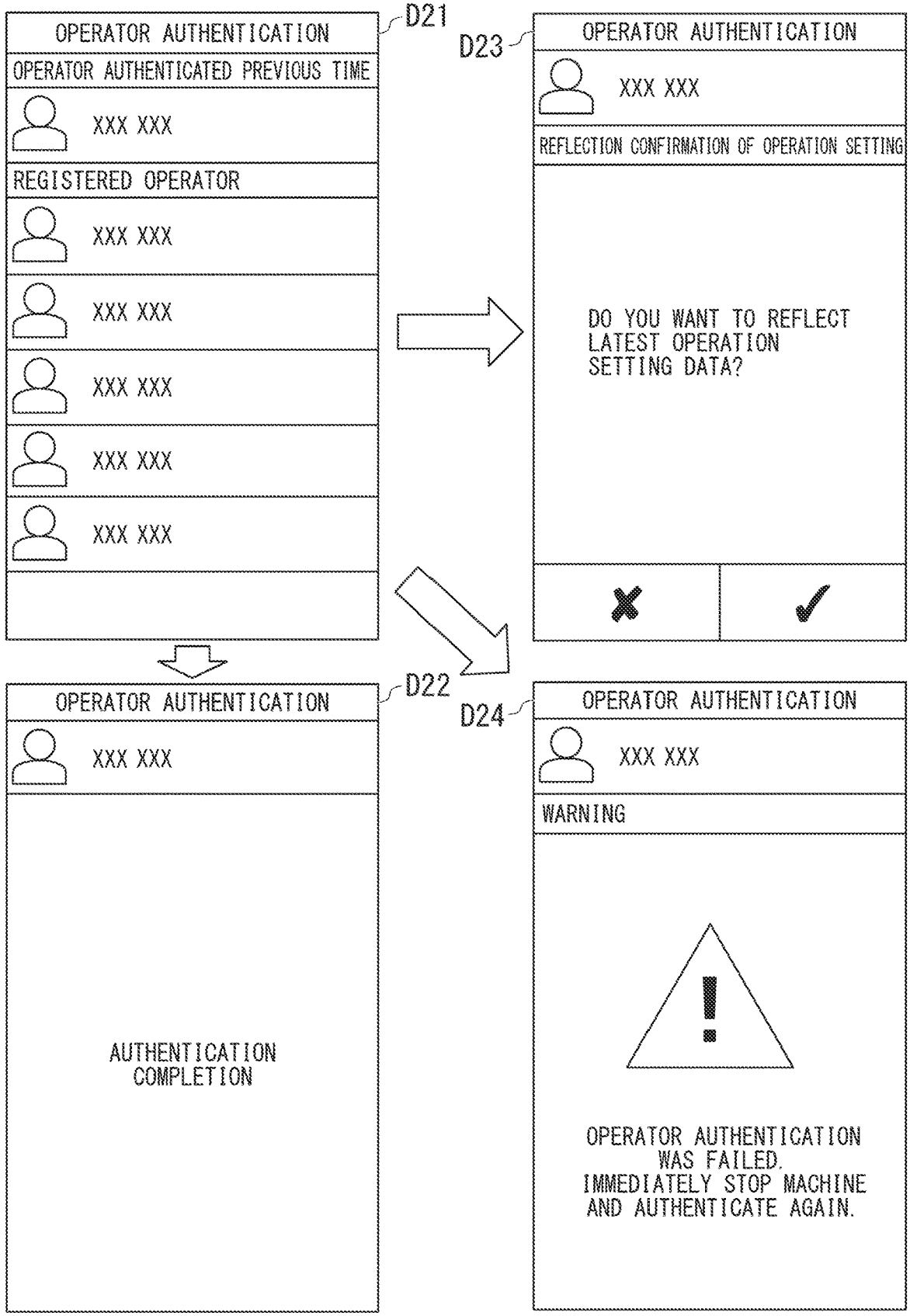
FIG. 9 is an example of a display screen of the touch panel in the authentication processing according to the first embodiment.

FIG. 8 is a flowchart showing authentication processing for an operator after the gateway function controller 203 according to the first embodiment is activated. FIG. 9 is an example of a display screen of the touch panel 145D in the authentication processing according to the first embodiment.

When the communication unit 241 of the monitor controller 204 receives the activation notification from the activation notification unit 234 of the gateway function controller 203, the authentication processing described below is executed. Note that, when the monitor controller 204 is in the process of executing the simple authentication shown in FIG. 6 described above, the monitor controller 204 stops the simple authentication and executes the authentication processing described below.

The communication unit 241 acquires a list of operators who are able to operate the work machine 100 from the gateway function controller 203 (step S201). Next, the display control unit 242 generates a signal for displaying an operator list screen D21 for accepting selection of the operator ID on the basis of the received list, and outputs it to the touch panel 145D (step S202). The operator list screen D21 includes a plurality of operator IDs received from the gateway function controller 203. Thereby, the touch panel 145D accepts one selection from among the plurality of operators. The acquisition unit 243 acquires an operator ID from the operator via the touch panel 145D (step S203).

The communication unit 241 receives information on the operator terminal 300 connected in step S2 from the starter signal unit 202, and acquires the operator ID associated with the device address of the operator terminal 300 from the gateway function controller 203 (step S204). The authentication unit 245 determines whether or not the operator ID acquired by the acquisition unit 243 in step S203 matches the operator ID acquired in step S204 (step S205). If the operator ID acquired in step S203 matches the operator ID acquired in step S204 (step S205: YES), the authentication unit 245 determines that authentication of the operator has been successful.

If authentication of the operator has been successful, the authentication unit 245 reads the operator ID acquired in step S203 and the password associated with the operator ID from the list received in step S201, and records them in the storage unit 244 (step S206). Next, the authentication unit 245 determines whether or not the operator has already been authenticated by the simple authentication shown in FIG. 6 (step S207). If authentication by the simple authentication has not been performed (step S207: NO), the display control unit 242 causes the touch panel 145D to display an authentication success screen D22. Also, the communication unit 241 outputs an instruction to transmit the operation setting data related to the authenticated operator ID to the gateway function controller 203 (step S208). Thereby, the gateway function controller 203 transmits the operation setting data related to the authenticated operator ID to the control controller 205. Then, it is possible for the control controller 205 to perform a control based on the operation setting data related to the authenticated operator ID. Then, the monitor controller 204 ends the authentication processing.

On the other hand, if authentication by the simple authentication has been performed (step S207: YES), the display control unit 242 causes the touch panel 145D to display a reflection confirmation screen D23 that includes an indication that confirmation of the operator has been successful and a button for selecting whether or not to reflect the latest operation setting data, and accepts an input as to whether or not to reflect the operation setting data (step S209). The button may be operated only when there is no input from any of the operation devices 143 of the work machine 100. When the button intended to reflect the latest operation setting data is pressed (step S209: YES), the communication unit 241 outputs an instruction to transmit the operation setting data related to the authenticated operator ID to the gateway function controller 203 (step S208). Thereby, the latest operation setting data is reflected on the control controller 205. Note that, when the operation of the button is accepted only when there is no operation, it is possible to prevent a sudden change in operation due to a change in the operation setting data during the operation of the work machine 100. On the other hand, when the button not intended to reflect the latest operation setting data is pressed (step S209: NO), the monitor controller 204 ends the authentication processing.

If authentication of the operator has failed in step S205 (step S205: NO), the authentication unit 245 determines whether or not the operator has been authenticated by the simple authentication shown in FIG. 6 (step S210). If the simple authentication has not been performed (step S210: NO), the monitor controller 204 returns the processing to step S203 and continues the authentication processing.

On the other hand, if the simple authentication has been performed (step S210: YES), there is a likelihood that the operator on board the work machine 100 will be an unauthorized operator. Therefore, the display control unit 242 causes the touch panel 145D to display a warning screen D24 urging a stop of the work machine 100 (step S211), and ends the processing. That is, the display control unit 242 is an example of a warning unit. At this time, the monitor controller 204 may output an instruction to a speaker (not illustrated) to generate a warning sound inside the cab 140 and outside the work machine 100.

(Operation and Effects)

As described above, according to the first embodiment, the control system 145 includes the gateway function controller 203 that stores the master data for authenticating the plurality of operators who are able to operate the work machine 100, and the monitor controller 204 that authenticates the operator operating the work machine 100. The monitor controller 204 stores a combination of the operator ID and the password of the operator authenticated in the past as authentication information, and authenticates the operator on the basis of the stored authentication information when the gateway function controller 203 has not been activated. Thereby, it is possible for the control system 145 to perform authentication of the operator even if the gateway function controller 203 is not activated.

Also, when the gateway function controller 203 is activated, the control system 145 according to the first embodiment displays the authentication screen from which the plurality of operators may be selected. That is, the control system 145 accepts selection of one operator from the plurality of operators, and determines whether or not the selected operator is an operator in proximity to the work machine 100, thereby authenticating the operator. Since it is difficult for an outsider who does not have operational authority to recognize a specific operator present in the vicinity, it is possible for the control system 145 to prevent unauthorized login with a simple logic.

If the gateway function controller 203 is activated after authentication is performed on the basis of the past input information stored in the monitor controller 204, the control system 145 according to the first embodiment performs authentication again on the basis of the master data stored in the gateway function controller 203. The past input information stored by the monitor controller 204 is not the latest authentication information. For example, there is a likelihood that authority of the operator has changed in the server device 500 between the previous activation and the current activation of the work machine 100. Therefore, by the authentication being performed again on the basis of the master data stored in the gateway function controller 203, it is possible to prevent use by an unauthorized user such as an operator whose authority has been changed between the previous activation and the current activation.

The monitor controller 204 according to the first embodiment stores authentication information of the operator who has last been authenticated among the plurality of operators. Thereby, it is possible for the monitor controller 204 to realize the authentication before activation of the gateway function controller 203 while reducing an amount of the nonvolatile memory used. Also, the control controller 205 stores operation setting data of the operator who has last been authenticated among the plurality of operators in a non-volatile manner. That is, it is possible for the control controller 205 to retain the operation setting data of the operator who has last been authenticated by not initializing the operation setting data from the previous authentication at the time of activation. Thereby, it is possible for the control controller 205 to reflect setting of the authenticated operator while reducing an amount of nonvolatile memory used.

Second Embodiment

According to the control system 145 according to the first embodiment, the monitor controller 204 stores authentication information of one operator who has last been authenticated, and performs the simple authentication processing. In contrast, in a second embodiment, a gateway function controller 203 stores the authentication information of one operator who has last been authenticated, and performs the simple authentication processing. Specifically, the gateway function controller 203 includes two pieces of hardware including a first hardware having a master storage unit 232, and a second hardware that activates faster than the first hardware, and the second hardware stores authentication information of one operator who has last been authenticated in the second hardware to perform simple authentication processing. Also, authentication processing after activation of the first hardware is performed by the first hardware. Also, a control system 145 according to the second embodiment performs authentication using a password in both the simple authentication processing and the authentication processing.

The second hardware of the gateway function controller 203 according to the second embodiment has already been activated when the monitor controller 204 is activated in step S9 shown in FIG. 5. When the monitor controller 204 acquires the password in step S102 of FIG. 6, it transmits the password to the second hardware of the gateway function controller 203, and the second hardware performs the authentication processing in step S103. If the authentication is successful, the second hardware outputs a notification of completion of the simple authentication to the monitor controller 204 and a control controller 205.

Figure 10:
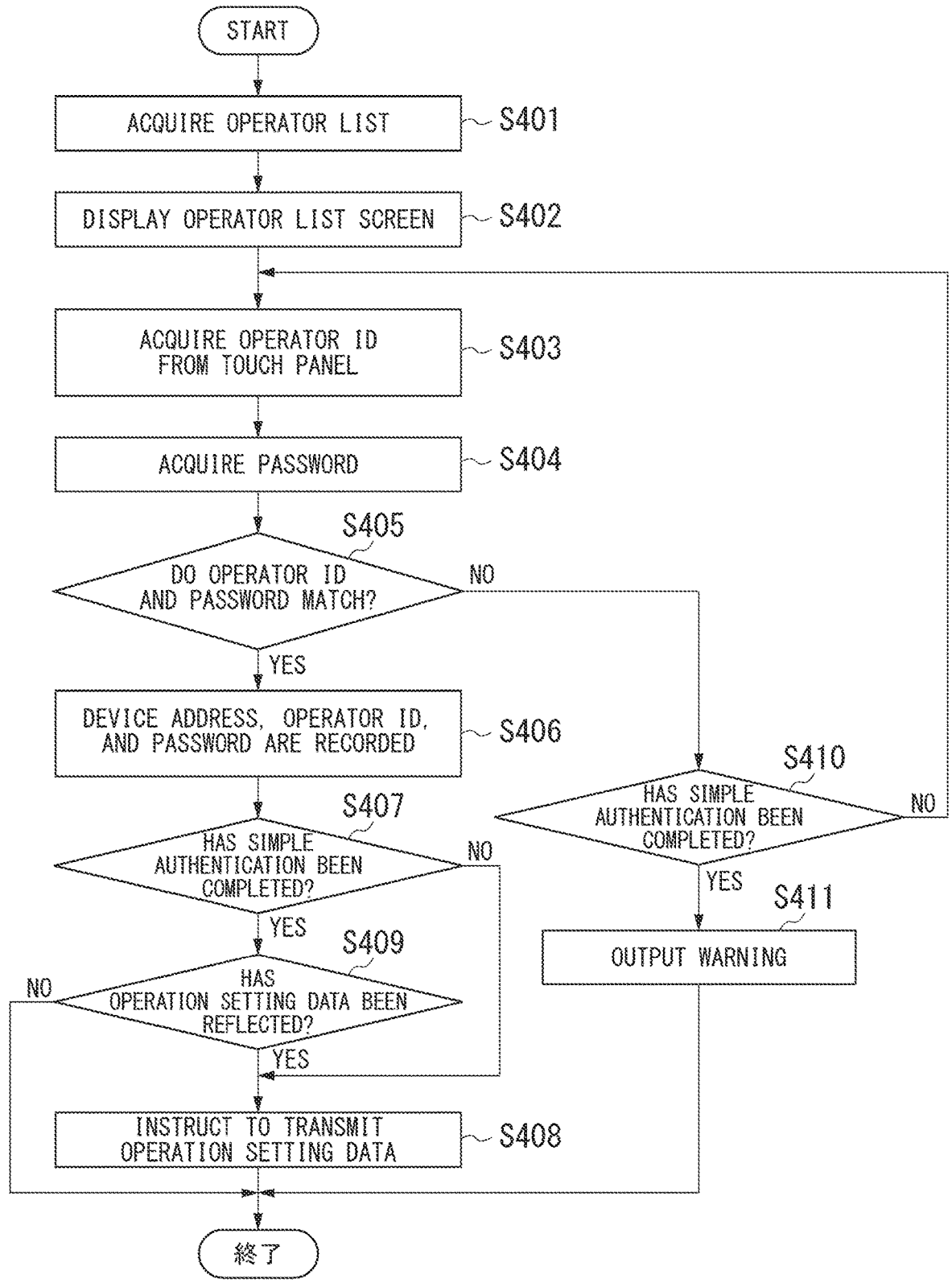
FIG. 10 is a flowchart showing authentication processing for an operator after a first hardware of a gateway function controller according to a second embodiment is activated.

FIG. 10 is a flowchart showing authentication processing for an operator after the first hardware of the gateway function controller 203 according to the second embodiment is activated.

When the first hardware of the gateway function controller 203 is activated, the control system 145 executes the authentication processing described below.

A communication unit 241 of the monitor controller 204 acquires a list of operators who are able to operate a work machine 100 from the gateway function controller 203 (step S401). Next, a display control unit 242 generates a signal for displaying an operator list screen D21 on the basis of the received list and outputs it to a touch panel 145D (step S402). An acquisition unit 243 acquires an operator ID from the operator via the touch panel 145D (step S403). The communication unit 241 transmits the acquired operator ID to the first hardware of the gateway function controller 203.

Next, the first hardware of the gateway function controller 203 acquires a password (step S404). Specifically, the first hardware acquires the password by the following procedure.

The first hardware transmits a password request to the second hardware. If the second hardware has already acquired the password in simple authentication, it is possible for the first hardware to acquire the password from the second hardware. On the other hand, if the second hardware has not acquired the password, the second hardware transmits information indicating that the password has not been acquired to the first hardware. When the first hardware receives information indicating that the password has not been acquired, it transmits a password request to the monitor controller 204. When the monitor controller 204 receives the password request, it displays the password input screen D12 shown in FIG. 7 and acquires the password from the operator. Thereby, it is possible for the first hardware to acquire the password from the monitor controller 204.

The first hardware determines whether or not a combination of the operator ID acquired in step S403 and the password acquired in step S404 is recorded in the master storage unit 232 (step S405). If the combination of the operator ID and the password matches the information stored in the master storage unit 232 (step S405: YES), the first hardware determines that authentication of the operator has been successful.

If authentication of the operator has been successful, the first hardware transmits the combination of a device address, the operator ID, and the password related to the authenticated operator from the master storage unit 232 to the second hardware. The second hardware records the information received from the first hardware (step S406). Next, the first hardware determines whether or not the operator has already been authenticated by the simple authentication by the second hardware (step S407). If authentication by the simple authentication has not been performed (step S407: NO), the first hardware transmits an instruction to display the authentication success screen D22 shown in FIG. 9 to the monitor controller 204. Also, the first hardware outputs an instruction to transmit operation setting data related to the authenticated operator ID to the gateway function controller 203 (step S408).

On the other hand, if authentication by the simple authentication has been performed (step S407: YES), the first hardware transmits an instruction to display the reflection confirmation screen D23 shown in FIG. 9 to the monitor controller 204. The monitor controller 204 determines whether or not a button of the reflection confirmation screen D23 pressed by the operator is a button intended to reflect the operation setting data (step S409). When the monitor controller 204 receives a press of the button intended to reflect the latest operation setting data (step S409: YES), the first hardware outputs an instruction to transmit the operation setting data related to the authenticated operator ID to the gateway function controller 203 (step S408). On the other hand, when the button not intended to reflect the latest operation setting data is pressed (step S409: NO), the control system 145 ends the authentication processing.

If authentication of the operator has failed in step S405 (step S405: NO), the first hardware determines whether or not the operator has been authenticated by the simple authentication by the second hardware (step S410). If the simple authentication has not been performed (step S410: NO), the control system 145 returns the processing to step S403 and continues the authentication processing.

On the other hand, if the simple authentication has been performed (step S410: YES), the first hardware transmits an instruction to display the warning screen D24 shown in FIG. 9 to the monitor controller 204 (step S411), and ends the processing.

Another Embodiment

As described above, although one embodiment has been described in detail with reference to the drawings, the specific configurations are not limited to those described above, and various design changes or the like may be made. That is, in another embodiment, the order of the processing described above may be changed as appropriate. Also, some of the processing may be executed in parallel.

The starter signal unit 202 according to the above-described embodiment may be configured by a single computer, or the configuration of the starter signal unit 202 may be disposed to be divided into a plurality of computers and the plurality of computers may function as the starter signal unit 202 in cooperation with each other. For example, in the starter signal unit 202, a function of outputting the activation signal and a function of authenticating the operator may be implemented on separate computers. Some of the computers configuring the starter signal unit 202 may be installed inside the work machine 100, and the other computers may be provided outside the work machine 100.

In the control system 145 according to the above-described embodiment, some of the components configuring the control system 145 may be installed inside the work machine 100, and the other components may be provided outside the work machine 100.

The operator terminal 300 according to the above-described embodiment is a terminal capable of executing an application program such as a smartphone, but the present disclosure is not limited thereto. For example, the operator terminal 300 according to another embodiment may be a key fob that only has a function of outputting a predetermined advertisement packet. Note that, if the operator terminal 300 is a key fob, selection of the work machine 100 to be activated is not able to be accepted by the application program. In this case, among the work machines 100 that have received the advertisement packet, the work machines 100 whose operator ID included in the advertisement packet is set as a specific operator may all be activated.

The monitor controller 204 according to the above-described embodiment stores the authentication information of one operator who has last been authenticated, but the present disclosure is not limited thereto. For example, the monitor controller 204 according to another embodiment may store authentication information for two or more operators. For example, the monitor controller 204 may always store the authentication information for the latest three instances. Also, for example, the monitor controller 204 may store authentication information related to an operator who frequently uses the work machine 100.

According to the control system 145 according to the first embodiment, the monitor controller 204 stores authentication information of one operator who has last been authenticated, and performs the simple authentication processing. Also, according to the control system 145 according to the second embodiment, the second hardware of the gateway function controller 203 stores authentication information of one operator who has last been authenticated, and performs the simple authentication processing. In contrast, in the control system 145 according to another embodiment, a controller other than the monitor controller 204, which activates faster than the gateway function controller 203 having the master storage unit 232, may store it, and the controller may perform the simple authentication processing.

If the authentication shown in FIG. 8 fails even though the operator has been authenticated by the simple authentication shown in FIG. 6, the monitor controller 204 according to the above-described embodiment outputs a warning to urge a stop of use of the work machine 100, but the present disclosure is not limited thereto. For example, if the authentication shown in FIG. 8 fails even though the operator has been authenticated by the simple authentication shown in FIG. 6, the monitor controller 204 according to another embodiment may cause the control controller 205 to stop outputting the control signal. That is, the monitor controller 204 may include a stop control unit that stops the work machine 100.

Also, the monitor controller 204 according to the above-described embodiment performs authentication using a password as the simple authentication, but the present disclosure is not limited thereto. For example, the monitor controller 204 according to another embodiment may acquire the device address included in the advertisement packet of BLE from the starter signal unit 202 via the internal network, and perform the simple authentication by collating the device address. Also, the monitor controller 204 according to another embodiment may perform biometric authentication.

The work machine 100 according to the above-described embodiment is a hydraulic excavator, but the present disclosure is not limited thereto in another embodiment. For example, the work machine according to another embodiment may be other work machines such as a dump truck, a wheel loader, a motor grader, and the like.

(Computer Configuration)

Figure 11:
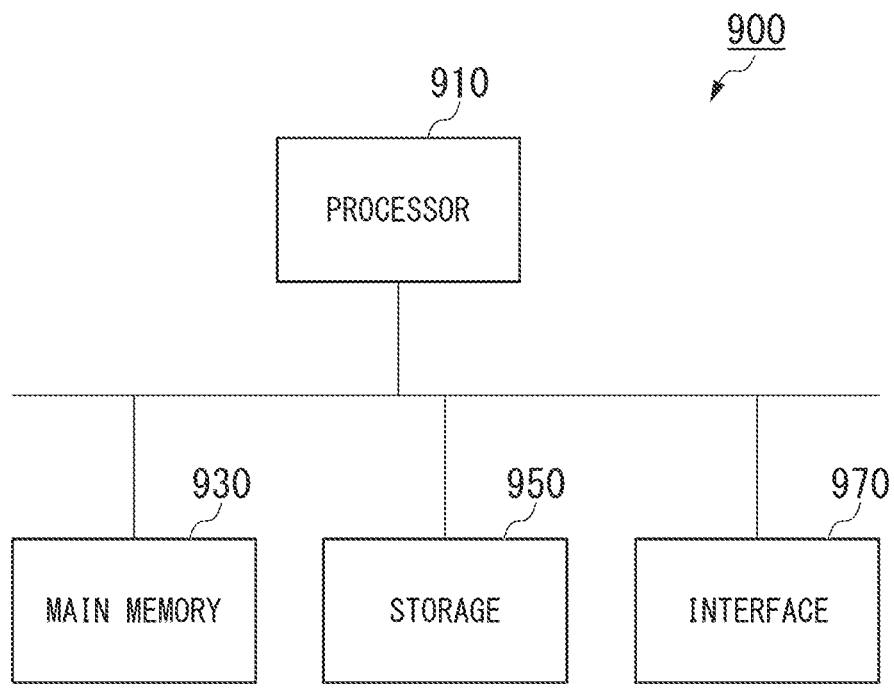
FIG. 11 is a schematic block diagram showing a configuration of a computer according to at least one embodiment.

FIG. 11 is a schematic block diagram showing a configuration of a computer according to at least one embodiment.

Each of the devices (the starter signal unit 202, the gateway function controller 203, the monitor controller 204, the control controller 205, and the like) included in the above-described control system 145 is installed in a computer 900. The computer 900 includes a processor 910, a main memory 930, a storage 950, and an interface 970. Operations of each processing unit described above are stored in the storage 950 in a form of a program. The processor 910 reads a program from the storage 950, loads it into the main memory 930, and executes the above-described processing according to the program. Also, the processor 910 secures storage regions corresponding to each of the above-described storage units in the main memory 930 according to the program. As examples of the processor

910, a central processing unit (CPU), a graphic processing unit (GPU), a microprocessor, and the like may be mentioned.

The program may be for implementing part of functions to be exhibited by the computer 900. For example, the program may exhibit the function in combination with other programs already stored in the storage or in combination with other programs installed on other devices. Note that, in another embodiment, the computer 900 may include a custom large scale integrated circuit (LSI) such as a programmable logic device (PLD) in addition to or in place of the above-described configuration. As examples of the PLD, a programmable array logic (PAL), a generic array logic (GAL), a complex programmable logic device (CPLD), and a field programmable gate array (FPGA) may be mentioned. In this case, part or all of the functions implemented by the processor 910 may be implemented by the integrated circuit. Such an integrated circuit is also included as an example of the processor.

As examples of the storage 950, a magnetic disk, a magneto-optical disk, an optical disk, a semiconductor memory, and the like may be mentioned. The storage 950 may be internal media connected directly to a bus of the computer 900, or may be external media connected to the computer 900 via the interface 970 or a communication link. Also, if this program is delivered to the computer 900 via a communication link, the computer 900 that received the delivery may load the program into the main memory 930 and execute the above-described processing. In at least one embodiment, the storage 950 is non-transitory tangible storage media.

Also, the program may be for implementing part of the functions described above. Further, the program may be a so-called differential file (differential program) that implements the above-described functions in combination with other programs already stored in the storage 950.

According to the above-described aspects, it is possible for the work machine activation system to perform authentication of an operator even if the management device that stores authentication information is not activated.

The invention claimed is:

1. A work machine activation system comprising:
   a management device storing master authentication information usable to authenticate a plurality of operators who are able to operate a work machine; and
   an authentication device configured to authenticate a current operator operating the work machine, the current operator being included among the plurality of operators; and
   a power supply unit that supplies electric energy to the management device and the authentication device to activate the management device and authentication device,
   the authentication device including
      a storage unit storing authentication information of a previous operator among the plurality of operators who was authenticated in the past, and
      an authentication unit configured to authenticate the current operator based on the authentication information stored in the storage unit when activation of the management device in response to the electric energy being supplied has not been completed.

2. The work machine activation system according to claim 1, wherein
   the previous operator is an operator who was last authenticated.

3. The work machine activation system according to claim 1, wherein
   the storage unit stores the authentication information of at least two operators authenticated in the past.

4. The work machine activation system according to claim 1, wherein
   the authentication device includes a display control unit displaying a first authentication screen which receives input information usable to authenticate the current operator as the previous operator authenticated in the past when the management device has not been activated.

5. The work machine activation system according to claim 4, wherein
   the authentication information includes a password, and
   the display control unit receives the password by an input on the authentication screen.

6. The work machine activation system according to claim 4, wherein
   the display control unit displays a second authentication screen, which receives input information usable to authenticate the current operator as any one of the plurality of operators when the management device has been activated, and
   the authentication unit authenticates the current operator based on the master authentication information stored in the management device when the management device has been activated.

7. The work machine activation system according to claim 1, wherein
   the authentication unit authenticates the current operator based on input information acquired via internal communication of the work machine and the authentication information stored in the storage unit.

8. The work machine activation system according to claim 1, wherein
   the authentication unit authenticates the authenticated current operator based on the master authentication information stored in the management device when the management device has been activated after authentication has been performed based on the authentication information stored in the storage unit.

9. The work machine activation system according to claim 8, wherein
   the authentication device includes a warning unit outputting a warning when authentication based on the master authentication information stored in the management device fails after the authentication based on the authentication information stored in the storage unit.

10. The work machine activation system according to claim 8, wherein
    the authentication device includes a stop control unit stopping the work machine when authentication based on the master authentication information stored in the management device fails after the authentication based on the authentication information stored in the storage unit.

11. The work machine activation system according to claim 1, further comprising:
    a vehicle body control device controlling a vehicle body of the work machine,
    the management device storing the master authentication information and operation setting data for each of the plurality of operators, and the vehicle body control device controlling the vehicle body based on the operation setting data related to the operator among the plurality of operators who is currently authenticated.

12. A method of activating a work machine, which includes a management device storing master authentication information usable to authenticate a plurality of operators, an authentication device configured to authenticate a current operator among the plurality of operators, and a power supply unit that supplies electric energy to the management device and the authentication device to activate the management device and authentication device, the method comprising:
- storing in a storage unit authentication information of a previous operator among the plurality of operators who was authenticated in the past; and
- authenticating, with the authentication device, the current operator based on the authentication information stored in the storage unit when activation of the management device in response to the electric energy being supplied has not been completed.

13. The work machine activation system according to claim 1, wherein
the management device is activated when it is determined that an operator having authority to operate the work machine is in proximity to the work machine.

14. The work machine activation system according to claim 1, wherein
the authentication device includes a display control unit displaying an authentication screen which receives input information usable to authenticate the previous operator and displaying an indication that other operators are being read, when the activation of the management device has not been completed.

15. The work machine activation system according to claim 1, further comprising a vehicle body control device controlling a vehicle body of the work machine, wherein
when the activation of the management device in response to the electric energy being supplied has not been completed and authentication of the current operator based on the authentication information stored in the storage unit is successful, the vehicle body control device controls the vehicle body based on operation setting data related to the previous operator.

16. The work machine activation system according to claim 15, wherein
when authentication of the current operator based on the master authentication information stored in the management device is successful after the authentication based on the authentication information stored in the storage unit, the authentication device accepts an input as to whether or not to reflect a latest operation setting data.

* * * * *